United States Patent [19]

Moran, Jr.

[11] 4,439,600
[45] Mar. 27, 1984

[54] CURE TO ELASTOMERS COMPOSITIONS

[75] Inventor: James P. Moran, Jr., Farmington, Conn.

[73] Assignee: Loctite Corporation, Newington, Conn.

[21] Appl. No.: 500,777

[22] Filed: Jun. 3, 1983

[51] Int. Cl.³ ............... C08G 81/02; C08G 63/76; C08F 283/04
[52] U.S. Cl. ............... 528/392; 525/440; 525/455; 525/920
[58] Field of Search ........... 525/440, 455, DIG. 920; 528/392

[56] References Cited

U.S. PATENT DOCUMENTS

| | | | |
|---|---|---|---|
| 4,145,509 | 3/1979 | Bhatia | 525/455 X |
| 4,309,526 | 1/1982 | Baccei | 525/455 X |
| 4,317,894 | 3/1982 | Lewarchik et al. | 525/455 |
| 4,346,201 | 8/1982 | Simms | 525/455 X |
| 4,348,503 | 9/1982 | Bachmann | 525/455 |
| 4,380,613 | 4/1983 | Nativi | 525/440 |
| 4,410,668 | 10/1983 | Piccirilli et al. | 525/440 |

*Primary Examiner*—Lucille M. Phynes
*Attorney, Agent, or Firm*—Walter J. Steinkraus; Eugene F. Miller

[57] ABSTRACT

Disclosed are cure-to-elastomer compositions comprising: (A) a moderate-to-long chain di or polyfunctional prepolymer having vinyl reactive ends, (B) a cross-link controlling material which is (i) reactive with said moderate-to-long chain di or polyfunctional prepolymer, and (ii) soluble in or miscible with the moderate-to-long chain prepolymer; and (C) a free radical polymerization initiator. The polymerizable compositions of the present invention can be rapidly cured at room or moderate temperature to produce elastomeric materials of high flexibility and appropriate tensile strength.

74 Claims, No Drawings

CURE TO ELASTOMERS COMPOSITIONS

BACKGROUND OF THE INVENTION

This invention concerns polymer materials, and more particularly polymerizable compositions that are normally liquid in uncured state, and which upon polymerization form highly flexible rubber-like polymers or elastomers. Depending on the exact formulation, such materials may find utility as sealing compounds, gasketing compounds and adhesives, although other uses are contemplated.

Rubber-like elasticity is in many respects a unique phenomenon, involving physical properties markedly different from those of low-molecular-weight solids, liquids, or gases. Typically, rubber-like materials or elastomers exhibit the following physical characteristics:

a. Ability to stretch rapidly and considerably under tension, reaching high elongation with low damping, i.e., little loss of energy as heat;

b. High tensile strength and high modulus (stiffness) when fully stretched;

c. Rapid retraction, exhibiting the phenomenon of snap or rebound; and d. Recovery of their original dimensions fully on the release of stress, exhibiting the phenomena of resilience and low permanent set.

(See F. W. Billmeyer, Textbook of Polymer Science, John Wiley & Sons, Second Edition, 1971, page 191).

On the molecular level rubber-like materials or elastomers may be characterized by the following features:

a. Moderate to high polymer material;

b. Above its glass transition temperature $T°$;

c. Amorphorous in its stable (unstressed) state; and d. Containing a network of crosslinks to restrain gross mobility of its chains.

A unique feature common to elastomers is the presence of moderate to long polymer chains. These chains ordinarily are connected to one another by cross-linkages, but the preponderance of the structure typically consists of the intervening polymer chains each comprising a relatively large number of single bonds between points of cross-linkage. The process by which a network of cross-links is introduced into a polymer material to produce rubberlike elasticity is referred by as "vulcanization", although "vulcanization" and "curing" often are used synonomously with "crosslinking". Vulcanization provides many relatively weak "fix points" to the more diffuse network of strong primary bonds of a polymer material thus restraining the long-range movements of the polymer molecules, while leaving their local segmental mobility high. In a sense vulcanization may be considered as the chemical modification of a polymer material that decreases the flow of the material, increases its tensile strength and modulus, but preserves its extensibility.

Generally speaking, most elastomeric materials are prepared via a two-step process. The first step which consists of preparation of a moderate to long polymer chain, and the second step in which the moderate to long chain polymer is fabricated into the shape of the finished product. Vulcanization takes place during fabrication, i.e. the second step, and typically involves subjecting the moderate to long chain polymer material to conditions of elevated temperature, and/or elevated pressure in the presence of sulfur, an oxidizing agent or a free radical generator. A disadvantage of conventional cure-to-elastomer polymerizable materials is the requirement that the materials be made into elastomeric products only in vulcanization dedicated processing equipment.

Cure-to-elastomer polymerizable compositions based on single-component polysiloxane block copolymers offer an advantage over conventional elastomeric materials in that they can be cured in-situ, e.g., in the presence of atmospheric moisture. However, single-component polysiloxane block copolymers are somewhat thick making them difficult to apply. Moreover, single-component polysiloxane block copolymers require relatively long cure, and the resulting cured products exhibit only moderate elasticity and flexibility.

It is thus a primary object of the present invention to provide novel and improved cure-to-elastomer polymerizable compositions which overcomes the aforesaid and other disadvantages of prior art cure-to-elastomers polymerizable materials. Other objects are to provide improved cure-to-elastomer polymerizable compositions demonstrating extended pot life and ease of application, and which are capable of undergoing vulcanization in-situ. Yet other objects are to provide single-component, cold, i.e. room temperature, or moderate temperature, e.g. 100° C., vulcanizable cure-to-elastomer polymerizable compositions of the aforesaid type which vulcanized products demonstrate superior elasticity and flexibility, rapid cure, and chemical and moisture resistance. Yet other objects will appear obvious and will in part appear hereinafter.

The invention accordingly comprises the processes involving the several steps in relative order of one or more steps with respect to each other, and the materials and compositions possessing the features, properties and relations of elements which are exemplified in the following disclosure and scope of application of which will be indicated in the claims.

SUMMARY OF THE INVENTION

Generally, the foregoing and other objects of the present invention are achieved by the provision of a cure-to-elastomer composition which comprises: a polymerizable composition comprising (A) a moderate-to-long chain di or polyfunctional prepolymer having vinyl reactive ends, (B) a cross-link controlling material which is (i) reactive with the moderate-to-long chain di or polyfunctional prepolymer, and (ii) soluble in or miscible with the moderate-to-long chain di or polyfunctional prepolymer; and (C) a free radical polymerization initiator. The instant polymerizable compositions can be rapidly cured at room or moderate temperature to produce elastomeric materials of high flexiblity and appropriate tensile strength.

For a fuller understanding of the nature and objects of the present invention, reference should be made to the following detailed description of the invention taken in connection with the accompanying examples.

As used herein, the terms "cold" and "room-temperature vulcanization" are used to define a process of curing, under conditions of ambient temperature, normally liquid or pre-polymer material into a solid polymer material of higher molecular weight having appropriate values of cross-link density to provide rubber-like properties or "rubber-like elasticity".

DETAILED DESCRIPTION OF THE INVENTION AND ITS PREFERRED EMBODIMENTS

The cure-to elastomer compositions of the present invention may be viewed as a one-component polymerizable flexible block copolymer having increased cross-link spacing or reduced cross-link density architecture. This decreased cross-link density architecture is achieved by introducing a kinetic path which permits one-to-one coupling of monomer material at the expense of cross-linking by copolymerizing monofunctional monomer units and flexible moderate-to-long chain di or polyfunctional prepolymers (which are "capped" with vinyl reactive end groups such as acrylate, methacrylate or allyl functionality) to form chains of vinyl copolymer having crosslinks through the flexible prepolymer segments. The vinyl copolymers thus formed having crosslinking units of the flexible prepolymer spaced sufficiently far apart to allow flexing of the vinyl copolymer section under external strain so as to permit transfer of the external strain to the flexible prepolymer crosslink sections. Polymerization of only the flexible prepolymer in the absence of the monofunctional monomer produces a product which is flexible to some extent but fractures when bent. The product would be described as being "cheesee". This behavior, in the absence of the monofunctional monomer, is a result of the tightly crosslinked vinyl polymer backbone generated from the polymerization of the reaction vinyl end groups of the prepolymer. This backbone vinyl polymer is essentially fully extended and relatively rigid due to the steric crowding resulting from having the flexible segments adjacent to one another and extending out from the backbone chain (rather like teeth from a comb but at random angles to the backbone rib of the comb). When external strain is imposed on this type of structure, almost all of the strain is taken up by the already fully extended vinyl polymer backbone with very little strain being absorbed by the flexible cross-linking prepolymer segments. This results in failure of the rigid segment and an avalanche transfer of the strain to other rigid segments already under strain without allowing the flexible segments to absorb the transferred strain. The other rigid segments are already under strain, thus, the additional strain from failed segments results in a catastrophic failure.

The desired reduced cross-link density architecture also may be achieved through the use of allyl monofunctional monomers or allyl "capped" flexible prepolymers. The allyl groups tend to undergo some random chain transfer and disproportionation as well as copolymerization (with methacrylate or acrylate). This random chain transfer and disproportionation results in some lengthening of the distance between crosslinks and thus emperically determined mixtures of allyl capped difunctional flexible prepolymers and methacrylate or acrylate capped difunctional or polyfunctional flexible prepolymers can be optimized for the best elongation and strength properties in the cured product.

In yet another embodiment of the invention, difunctional mercaptan chain transfer (i.e. radical chain transfer)-coupling agents, for example dimercaptan esters such as dimercaptoacetate esters of polyethylene diols are used in admixture with methacrylate or acrylate "capped" prepolymers to shorten the chain length polymerized and at the same time bring about the coupling of two of the flexible prepolymer segments for each molecule of dimercaptan. This results in increasing distances between crosslinks, and coupling of the short rigid sections through the flexible prepolymer segment, thus, increasing the amount of external strain that can be transferred to the flexible prepolymer segments. By this method low strength elastomers yielding up to 1600% or greater elongation at break have been prepared.

The cure-to-elastomer compositions of the present invention are formed by blending (A) a moderate-to-long chain flexible prepolymer, as above-described, (B) a cross-link controlling material which is (i) reactive with the moderate-to-long chain di or polyfunctional prepolymer, and (ii) soluble in or miscible with the moderate-to-long chain prepolymer, and (C) a free radical polymerization initiator system. The cross-link controlling material preferably comprises one or a mixture of monofunctional short chain monomers and/or polymerization chain transfer and coupling agents.

PART (A) (THE MODERATE-TO-LONG CHAIN PREPOLYMER)

The moderate-to-long chain prepolymers employed in the present invention preferably comprise polyether-urethane or polyester-urethane derivatives formed by reacting a polyether diol or a polyester diol with a diisocyanate, and reacting the resulting product with either a polymerizable acrylic or methacrylic acid ester, or allyl alcohol. One preferred polyester diol is manufactured by Mobay Chemical Corporation under the trade name Desmodure 1700. The manufacturer describes this polyester diol as being derived by the reaction of diethylene glycol and adipic acid (hexanedioic acid). Another preferred polyester diol is manufactured by the Inolex Company under the Trademark Inolex 1400-120. The manufacturer describes this polyester diol as being derived by the reaction of neopentyl glycol and 1,6 hexanediol with adipic acid. Other useful polyester diols may be formed by the reaction of a glycol of at least two carbon atoms with a dicarboxylic acid of more than three carbon atoms, e.g., poly 1,4-butane diol adipate.

The preferred diisocyante is toluene diisocyante (TDI), although other relatively low molecular weight diisocyanates of the general formula:

$$(O-C-N)_2 R \qquad (I)$$

wherein R is a $C_{2-20}$ alkylene, alkenylene or cycloalkylene radical or a $C_{6-40}$ arylene, alkarylene or aralkylene are useful.

The reaction ratio of the equivalent weights of the polyester diol to the diisocyanate should generally be in the range of about 1.0 hydroxyl equivalent of polyester diol to about 1.7 to about 2.2 isocyanate equivalents of diisocyanate. The preferred reaction ratio is 1.0 hydroxyl equivalent of the polyester diol for every 2.0 isocyanate equivalents of diisocyanate. This preferred reaction ratio yields a final composition with a chemical structure having a high degree of flexibility and isocyanate termination.

The isocyanate terminated polyester prepolymer product described above is then reacted with a hydroxyl-containing acrylate or methacrylate ester momomer, producing acrylate end-capping, or with allyl alcohol producing allyl end-capping. The useful range of hydroxyl equivalents of the ester or alcohol monomers is about 0.9 to about 3.0, the preferred being in the range of 1.8 to 2.2, and the most preferred being about 2.0 equivalents for every 2.0 isocyanate equivalents of prepolymer.

The polymerizable acrylate and methacrylate ester monomers and reactive vinyl alcohols such as allyl alcohol used to cap the polyester diisocyanate reaction product may be mono- or di-functional. Mono-functional monomers are preferred. Those monofunctional monomers found most effective are selected from the group consisting of hydroxyalkyl acrylates and methacrylates, amino alkyl acrylates and methacrylates, and allyl alcohols. The most preferred polymerizable ester monomers are hydroxyethyl methacrylate and hydroxypropyl methacrylate. Additional monofunctional polymerizable ester monomers deemed useful are represented by the formula:

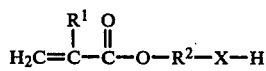    (II)

wherein X is —O— or

$R^3$ is hydrogen or lower alkyl of 1 to 7 carbon atoms; $R^1$ is selected from the group consisting of hydrogen, chlorine and methyl and ethyl radicals; and $R^2$ is a divalent organic radical selected from the group consisting of lower alkylene of 1-8 carbon atoms, phenylene and naphthylene.

The most preferred allyl alcohol is propenyl alcohol. Other allyl alcohols deemed useful are represented by the formula:

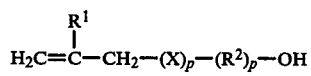

wherein X, $R^1$ and $R^2$ are as above described; and p is 0 or 1.

Suitable hydroxy- or amine-containing materials are exemplified by, but not limited to, such materials as hydroxyethyl acrylate, hydroxyethyl methacrylate, aminoethyl methacrylate, 2-hydroxypropyl methacrylate, 3-hydroxypropyl methacrylate, aminopropyl methacrylate, hydroxyhexyl acrylate, t-butylaminoethyl methacrylate, hydroxyoctyl methacrylate, and the monoacrylate or monomethacrylate esters of bisphenol-A, the fully hydrogenated derivative of bisphenol-A, cyclohexyl diol, polyethyleneglycol methacrylate, and the like.

The end-capping reaction may be accomplished in the presence or absence of diluents. Diluents which include the hydrocarbons such as aliphatic, cycloaliphatic and aromatic hydrocarbons, for example, benzene, toluene, cyclohexene, hexane, heptane, and the like, may be employed, but other diluents, such as methyl isobutyl ketone, diamyl ketone, isobutyl methacrylate, and cyclohexyl methacrylate can also be beneficially utilized.

Other diluents which are useful conform to the formulas:

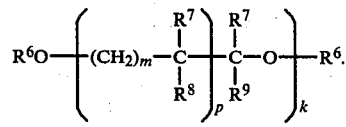    III wherein $R^7$ is H, $C_{1-4}$ alkyl or hydroxyalkyl or $R^6OCH_2$—; $R^9$ is H, halogen or $C_{1-4}$ alkyl; $R^8$ is H, OH OR $R^6O$—; $R^6$ is $CH_2$=$CR^9C$=O; m is an integer, preferably 1 to 8; k is an integer, preferably 1 to 20; and p is 0 to 1; or

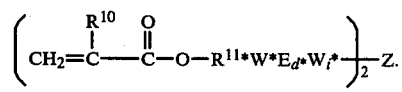    IV wherein $R^{10}$ is selected from the group consisting of hydrogen, chlorine, and methyl and ethyl radicals; $R^{11}$ is a bivalent organic radical selected from the group consisting of lower alkylene of 1–8 carbon atoms, phenylene, and naphthylene; W is a polyisocyanate radical; E is an aromatic, heterocyclic inkage; Z may also be a polymeric or copolymer methylene ether polyol radical; or

    V.

wherein X is —O— or —$R^{12}$N—; $R^{12}$ is selected from the group consisting of H or lower alkyls of 1 through 7 carbon atoms; A is $CH_2$=$CR^{13}$.CO.O.—; $R^{13}$ is H, or $CH_3$; n is an integer from 2 to 6 inclusive; and B is a polyvalent substituted or unsubstituted alkyl, alkenyl, cycloalkyl, aryl, aralkyl, alkyloxyalkylene, aryloxy-arylene or heterocyclic radical; or

    VI.

wherein $R^{14}$ is R, $CH_3$, $C_2H_5$ or $C_1$; $R^{15}$ is a $C_{2-20}$ alkylene, alkenylene or cycloalkylene radical or a $C_{6-40}$ arylene, alkarylene, aralkarylene, alkyloxyalkylene or aryloxyarylene radical which may be substituted by 1–4 chlorine atoms or by 1–4 chlorine atoms or by 1–3 amino or mono- or di-$C_{1-3}$ alkylamino or $C_{1-3}$ alkoxy groups: $R^{16}$ is one of the following less one hydrogen atoms: (a) a $C_{1-8}$ hydroxy alkyl or aminoalkyl group, (b) a $C_{1-6}$ alkylamino-$C_{1-8}$ alkyl group; or (c) a hydroyphenyl, an aminophenyl, a hydroxynaphthyl or an amino naphthyl group which may be further substituted by an alkyl, alkylamino or dialkylamino group, each alkyl group in this subpart (c) containing up to about 3 carbon atoms.

If desired, the diluents also may act as the short chain monofunctional monomer of the composition. The most preferred diluents/monomers are hydroxyethyl methacrylate, hydroxypropyl methacrylate and the monoacrylate and monomethacrylate esters of bisphenol-A.

It will be appreciated that the acrylate- or methacrylate or allyl terminated prepolymers employed in this invention may be prepared by processes other than that described above. Thus, for instance, the polyisocyanate compound can be reacted with a suitable hydroxyacrylate or methacrylate and the resulting product reacted with a suitable glycol polyester or polyether to produce the desired prepolymer product. Alternatively a carboxylic acid terminated polyester (such as Desmodure 1700 that has been esterified with additional adipic acid to generate carboxylic acid end groups) may be reacted with glycidyl methacrylate or allyl glycidyl ester in the presence of triethylamine or a mixture of triethylamine and 2 methyl-imidazole to produce a methacrylate terminated polyester prepolymer having no urethane or urea linkages.

The presently preferred polyether diol for preparing polyether-urethane derivatives is manufactured by the Quaker Oats Company under the Trademark Polymeg 2000. The manufacturer describes this polyether diol as a polyether with a 1,4 butylene oxide repeat unit. Other polyether-urethane derivatives may be prepared from polypropyleneoxide diols and triols, polyethyleneoxide diols and various other diols and triols as are readily available commercially from a variety of manufacturers.

The moderate-to-long chain prepolymer of the instant invention may also comprise a di-functional monomer such as the dimaleate half ester of polydiethylene glycol adipate (desigated as MRM) formed by the reaction of Desmodure 1700 polyester diol and maleic anhydride, and the dimethacrylate of polydiethylene glycol adipate (designated as MARAM) formed by the reaction of Desmodure 1700 polyester diol with methacrylic acid.

PART (B)

THE CROSSLINK DENSITY CONTROLLING CO-REACTIVE MONOMER

The co-reactive monofunctional monomer employed in the present invention to provide the necessary spacing between flexible prepolymer crosslinks of the Part A moderate-to-long chain prepolymer units may be any short chain monomer which is (1) copolymerizable with the ractive terminations of the Part A moderate to long chain prepolymer, and (2) miscible with or soluble in the Part A moderate-to-long chain prepolymer. The presently preferred co-reactive monomers are of relatively high molecular weight and relatively low volatility. One preferred class of monomers are the monomethacrylate or monoacrylate esters of aryl, alkyl and arylalkyl alcohols and the arylamino, alkylamino and arylalkylamino methacrylate and acrylate esters prepared by reacting an glycidyl ether or a 1,2-epoxyethyl substituted compound with acrylic acid, methacrylic acid, or an aminoalkyacrylate or methacrylate. The reaction of an alkyl, aryl or alkaryl glycidyl ether or a 1,2 epoxyethyl compound with acrylic or methacrylic acid is conducted in the presence of a suitable catalyst such as 2-methyl imidozol and/or triethylamine. The aminoalkylmethacrylate and aminoalkylacrylate esters do not usually require a catalyst. The reaction preferably is brought about in the absence of diluents at controlled temperature to produce a monomethacrylate or monoacrylate of relatively high purity that may readily be freed of catalyst and minor side products by water washing and vacuum stripping.

Amongst preferred monofunctional monomers of the foregoing class are the reaction products of phenyl glycidyl ether and methacrylic acid or acrylic acid, 3-phenoxy-2-hydroxypropyl methacrylate or 3-phenoxy-2-hydroxypropyl acrylate, the reaction products of methacrylic acid and acrylic acid with para-tertiary butyl phenyl glycidyl ether, ortho-cresyl glycidyl ether, butyl glycidyl ether and the glycidyl ethers of decane to octadecane.

Other co-reactive monomers that may be used in the present are the methacrylate and acrylate esters derived from glycidyl ethers are mixed esters such as glycerol 1-(2-ethyl) hexanoate-3-methacrylate and glycerol 1-(2 ethyl) hexanoate-3-acrylate prepared by the reacting glycidyl methacrylate or glycidyl acrylate and 2-ethylhexanoic acid in the presence of a suitable catalyst such as 2-methyl imidizole and/or trialkyl amine. Other useful mixed esters of acrylate and methacrylate may be prepared by reacting various carboxylic acids and glycidyl acrylate or methacrylate or by reacting an aminoethyl ester and glycidyl methacrylate or acrylate in the absence of catalysts.

A second class of preferred short chain monofunctional co-reactive monomers that may be used in the present invention may be prepared by reacting 1-hydroxyethyl methacrylate, 2-hydroxyethyl acrylate, 2-hydroxypropyl methacrylate or 2-hydroxypropyl acrylate and a isocyanate. For example, the foregoing acrylates or methacrylates may be reacted with phenylisocyanate to produce the corresponding phenyurethane of the methacrylate or acrylate hydroxy ester. One preferred monofunctional monomer prepared in accordance with the foregoing is the reaction product of 2-hydroxyethyl methacrylate with phenylisocyanate thereby forming 2-methacryloxyethyl phenylurethane. Other preferred co-reactive monomers may be prepared by reacting one equivalent (1 mole) of a lower alcohol such as methyl-, ethyl-, propyl-, n-butyl-, isobutyl- or isopentyl-alcohol with two equivalents (1 mole) of 2,4 toluene diisocyanate to produce the corresponding 2-isocyanate-4-urethane toluene monoisocyanate product. The resulting monoisocyanate product is then reacted with one equivalent (1 mole) with a hydroxy-acrylate or methacrylate ester or an amino alkyl acrylate or methacrylate to produce the corresponding acrylate or methacrylate urethane ester. Amongst preferred monofunctional monomers prepared are mentioned: the reaction product of methanol, 2-hydroxymethacrylate and toluene diisocyanate thereby forming 4-methoxycarbonylamino-2-(2-methacryloxy) ethoxycarbonylamino-toluene; and, the reaction product of isopentyl alcohol, 2-hydroxyethylmethacrylate and toluene diisocyanate thereby forming 4-isopentyloxycarbonylamino-2-(2-methacryloxy) ethoxycarbonylamino toluene which are given as exemplary.

These aforesaid preferred vinyl monofunctional methacrylate or acrylate urethane esters confer special wetting and adhesion properties to the final composition, exhibit low volatility and increase the spacing between cross-linking sites on the flexible moderate-to-long chain prepolymer segments.

THE POLYMERIZATION CHAIN TRANSFER AGENT

The polymerization chain transfer and coupling agents which may be advantageously used in the instant invention comprise relatively short-chain-reactive-end difunctional chain transfer and coupling agents which are co-reactive with and soluble in or miscible with the moderate-to-long chain prepolymer (Part A). Amongst preferred polymerization chain transfer and coupling agents are mentioned the dimercaptoacetates and substituted mercaptocarboxylic acid esters of glycol polyethers and polyesters such as triethylene glycol dimercaptoacetate (designated as MATEG) which is formed by the reaction of triethylene glycol and mercaptoacetic acid; triethylene glycol dimercaptopropionate (MPTEG) formed by the reaction of triethylene glycol and mercaptopropronic acid; and, the di-3-mercaptopropionate of polydiethylene glycol adapate (designated as HSPRPSH) which is formed by the reaction of Desmodure 1700 polyester diol and mercaptopropionic acid, which are given as exemplary.

Mixtures of the aforesaid and other mono and difunctional polymerization chain transfer and coupling agents, if desired mixed with one or more co-reactive monomers as above described also may be advantageously employed.

As noted supra the co-reactive monomers and the chain transfer and coupling agents must be soluble in or miscible with the moderate to-long chain prepolymer. Solubility or miscibility of the co-reactive monomer and the chain transfer and coupling agents in the moderate-to-long chain prepolymer readily may be determined by blending the co-reactive monomers, the chain transfer and coupling agents, and the moderate-to-long chain prepolymer, and visually inspecting for solubility or miscibility.

The physical properties of the resulting cured composition can be varied from a highly extensible elastomer to a tough, relatively hard, solid polymer by the selection of components and adjustment of ratios of components. As noted supra the composition should contain (A) at least one moderate-to-long chain di or polyfunctional vinyl prepolymer, (B) at least one monofunctional short chain co-reactive monomer and/or at least one difunctional dimercaptan polymerization chain transfer and coupling agent, and (C) a free radical polymerization initiator. Additional polymer property modification can be achieved by the inclusion of other short chain di and/or polyfunctional monomers and/or mercaptan or other chain transfer and coupling agents.

If a substantial molar excess of moderate-to-long chain acrylate or methacrylate terminated difunctional prepolymer is present, compared to the monofunctional short chain monomer, and in the absence of difunctional or monofunctional mercaptan or other polymerization chain transfer coupling agents, the resulting cured polymer will be flexible but relatively weak showing very low break and tear strength at low extension. Increasing the relative amount (up to an emperically determined maximum) of monofunctional monomer (methacrylate or acrylate) will result in increasing strength in break and tear strength and increasing elongation at break. Increasing the proportion of allyl terminations either as part of the prepolymer portion or as the monofunctional short chain portion typically will result in an increase of break and tear strength at modest elogation much more rapidly than as the elongation is increased. The use of increasing amounts of the difunctional chain transfer and coupling agents (for example a dimercaptoester of polyethylene glycol or polyester glycol) results in relatively low strength but rapid increasing elongation of up to 1600% at break (typical rubber stress-strain response is demonstrated).

Typically the short chain monomer or chain transfer and coupling agent will comprise from 50 mole percent (one monofunctional monomer unit for every difunctional prepolymer unit) to about 98 mole percent (fifty monofunctional monomer units for every difunction prepolymer unit) and preferably will comprise about 91 mole percent (ten monofunctional monomer units for every difunctional prepolymer unit) to about 95 mole percent (twenty monofunctional monomer units for every difunctional prepolymer unit).

THE INITIATOR SYSTEM

The initiator system comprises a free-radical initiator of the organic peroxy, hydroperoxy or other free radical initiator type. Included within this definition are materials such as organic peroxides or organic peresters which decompose to produce free radicals in situ. Examples of such peroxides and peresters are cyclohexyl hydroxycyclohexyl peroxide and t-butyl perbenzoate, respectively.

While the nature of the free radical initiator is not critical to the broad concept of this invention, the preferred organic peroxides and hydroperoxides can be represented by the formulas:

  VII(A)

$$R^{15}OOR^{15}$$

and

  VII(B)

$$R^{15}OOH$$

wherein $R^{15}$ is a hydrocarbon or carbonyl or mixture of carbonyl and hydrocarbon groups containing up to about 18 carbon atoms, and preferably is an alkyl, aryl or aralkyl hydrocarbon group containing from about 3 to about 12 carbon atoms. Naturally $R^{15}$ can contain any substituent or linkage, hydrocarbon or otherwise, which does not affect the peroxide or hydroperoxide adversely for the purpose disclosed herein. Typical examples of such organic peroxides are benzoyl peroxide, tertiary butyl peroxide, and tertiary butyl peroxybenzoate. Typical examples of such organic hydroperoxides are cumene hydroperoxide, tertiary butyl hydroperoxide, methylethylketone hydroperoxide, and hydroperoxides formed by oxygenation of various hydrocarbons such as methylbutene, cetane and cyclohexene and various ketones and ethers, including certain compounds represented by the general formula VIII(B) above.

The polymerization initiator system which is used commonly comprises less than about 10 percent by weight of the combination of the polymerizable monomer and initiator and preferably comprises from about 0.1 percent to about 5 percent of the combination.

Ultraviolet ("uv") activated initiators may also be employed as polymerization initiators. Many uv activated polymerization initiators are known in the art and may be advantageously employed in the invention. For example, the uv activated initiators may be selected from metal carbonyls of the formula $M_x(CO)_y$ wherein M is a metal atom, x is 1 or 2, and y is an integer determined by the total valence of the metal atoms, generally 4 to 10. The preferred uv activated initiators are selected from (a) $C_{1-16}$ straight or branched chain alkyl diones; and (b) carbonyl compounds of the general formula $R^5(CO)R^6$ wherein $R^5$ is a $C_{1-10}$ alkyl, aryl, aralkyl or alkaryl group, and $R^6$ is $R^6$ or hydrogen. In addition, $R^5$ or $R^6$ can contain any substituents which do not adversely affect the compound in serving its function. For example, $R^5$ or $R^6$ can be alpha-substituted with an alkyl, aryl, alkaryl alkoxy or aryloxy radical, or with an amino or a mono- or dialkylamino derivative thereof, each of the above substituents containing up to about six carbon atoms. In addition, $R^5$ and $R^6$ taken together with carbonyl group form an aromatic or heterocyclic ketone containing up to about 16 carbon atoms. When using uv activated initiators it is frequently desirable to add low levels, such as up to about 500 parts per million by weight, of a free-radical or uv stabilizer, many of which are known in the art, to prevent spurious polymerization of the composition prior to the time of its intended use. Suitable free-radical stabilizers are hydroquinone, p-benzoquinone, butylate of hydroxytoluene, and butylate of hydroxyanisole.

OTHER INGREDIENTS

It is optional, but recommended, that chelators, cross-linking agents, and inhibitors be present in the cure-to-elastomer composition for optimum performance.

It generally is deemed desirable to include a minor amount (e.g. from about 0.1 to about 1% by weight) of a metal chelating agent in the cure-to-elastomer composition. The metal chelating agents may be chosen from any of those commonly known to the person reasonably skilled in the art for use in anaerobic compositions. The presently preferred metal chelating agents are ethylene-diamine tetraacetic acid (EDTA), and its sodium salt, 1,1-ethylenebis-nitril methylidyne dipyridine and the class of beta-diketones are generally the most effective and are preferred. For a more detailed discussion of these and other metal chelating agents see U.S. Pat. Nos. 4,038,475 and 4,262,106.

The inhibitor concentration left over in the monomers from manufacture often is high enough for good stability. However, to insure maximum shelf life, about 0.1 to about 1% by weight of the composition are recommended. Of those inhibitors which have been found of adequate utility is the group consisting of hydroquinones, benzoquinones, naphthoquinones, phenanthraquinones, anthraquinones, and substituted compounds of any of the foregoing. Additionally, various phenols can be employed as inhibitors, the preferred one being 2,6-di-tert-butyl-4-methyl phenol.

It also is useful, but not required, to incorporate an adhesion promoter into the cure-to-elastomer composition, particularly when the composition is to be employed as a gasket or adhesive. The adhesion promotors may be chosen from any of those commonly known to the person reasonably skilled in the art. The presently preferred adhesion promoter is of the well-known silane type and may be used in proportions of from zero to about 5% by weight of the cure-to-elastomer composition.

Also useful, but not required is a thixotropic agent. The thixotropic agent may be chosen from any of those commonly known to the person reasonably skilled in the art. The presently preferred thixotropic agent is fumed silica (SiO$_2$). The latter is available commercially from Degussa, Inc. under the Tradename Aerosil 200. Generally the thixotropic agent will be used in amount of from about zero to about 5% by weight of the cure-to-elastomer composition.

Also useful, but not required is a surface activator or primer. This latter ingredient is not included in the cure-to-elastomer composition due to their extreme activity and tendency to destroy the shelf stability of the cure-to-elastomer composition, but rather is separately applied to the surface of a substrate to be bonded prior to application of the composition. However, it is also feasible for the curable portion of the cure-to-elastomer composition to be put on a substrate and the activator applied over it. The primer serves to drastically increase speed of cure. Two types of activators are preferred. One type comprises aldehyde-amine condensation products, the preferred being butyraldehyde-aniline. Activators of this type are sold commercially by E. I. Dupont de Nemours & Co. under the name Buetene. The condensation products are usually in a solvent solution such as trichlorethane, or similar solvents, for easy application. The other type comprises substituted thioureas as disclosed in, for example U.S. Pat. Nos. 3,591,438, 3,625,930 and 3,970,505.

EXAMPLES

The invention will now be illustrated by the following description of certain preferred embodiments thereof, given by way of example only.

PREPARATION A

To a four-necked resin kettle equipped with a dry air sweep, a stainless steel stirrer, a nitrogen inlet tube, thermometer, condensor and stopcocks on entrance ports to allow evacuation, charge 4114.80 grams of Desmodure 1700 polyester diol available from MOBAY Chemical Corporation—this polyester diol is formed by the reaction of diethylene glycol and adipic acid. Heat kettle to 100° to 110° under vacuum for 60 minutes. Start dry air sweep and cool kettle to 40° C. and add in one shot 543.28 grams of MOBAY TDI 2,4 toluene diisocyanate. Upon the completion of the TDI addition, heat resin kettle with stirring (75° C. for three hours); check for NCO, add calculated amount of 2-hydroxyethylmethacrylate (HEMA)-approximately 475 grams and heat with stirring for four hours at 75° C. Recheck for the absence of NCO by IR analysis. The resulting solution contains approximately 100 percent concentration of bis(2-methacryloxyethyl urethane) of polydiethylene glycol adipate polyester, (designated as HTRTH) corresponding to the general formula (HEMA-TDI-D1700-TDI-HEMA).

PREPARATION B

To a resin kettle equipped as described in PREPARATION A charge 1571.2 g of (Desmodure 1700) polyester diol. Heat kettle to 100° to 110° under vacuum for 60 minutes. Start dry air sweep, cool kettle to 40° C., and add in one shot 214.6 grams of MOBAY TDI 2,4 toluene diisocyanate. Upon the completion of the TDI addition, heat resin kettle with stirring (75° C. for three hours); check for NCO, add calculated amount of allyl alcohol, approximately 42.8 grams and heat with stirring for four hours at 75° C. Recheck for the absence of NCO by IR analysis. The resulting solution comprises essentially 100 percent concentration of the diallylurethane of polydiethylene glycol adipate polyester (designated as ATRTA) corresponding to the general formula (ALLYL-TDI-D1700-TDI-ALLYL).

PREPARATION C

To a dry air swept, heated (approximately 40° C.) resin kettle, equipped as in PREPARATION A, was charged 165 grams of MOBAY TDI toluene diisocyanate (TDI). Slowly add 460 grams of (Inolex 1400-120 polyester, Inolex Company, Philadelphia, PA.) 1,6-hexanediol/neopentyl glycol adipate (PE) over 20 minutes. At the completion of the polyester addition, continue heating with stirring (40° to 45° C.) for one hour, followed by two hours heating with stirring at 100° C. Upon completion of the three-hour reaction period, lower bath temperature to 50° C., and add 230 grams of 2-hydroxyethylmethacrylate (HEMA). Heat reaction mixture to 50° C. with stirring for two hours; then add, with stirring, 1378 grams of Rohm & Haas QM-657 dicyclopentenyloxyethyl methacrylate (MA), and 146 grams of Rohm & Haas acrylic acid. Resulting solution comprises polyester-urethane-methacrylate resin diluted in monomer (designated as PEUMA).

PREPARATION D

To a dry air swept, heated (60° C.) resin kettle, equipped as described in PREPARATION A, charge 2614.38 grams of 2-hydroxyethylmethacrylate (HEMA) followed by the addition at a rate of approximately 5.97 grams per minute of 2332.99 grams of phenyl isocyanate. The temperature of the reaction mixture is maintained at 58° to 60° C. After completion of the phenyl isocyanate addition, heat with stirring at 50° to 60° C. for two hours; check for NCO content by IR analysis. Continue heating with stirring until NCO disappears, add approximately 10 grams of 2-hydroxyethylmethacrylate (HEMA), and stir and heat until NCO disappears (IR analysis). A solid, crystalline product (MP 60°) 5007.37 grams of 2-methacryloxyethyl phenylurethane (designated as 2MEP) results.

PREPARATION E

To a dry air-swept, heated (40° C.) resin kettle, equipped as described in PREPARATION A, charge 2819.81 grams of phenylglycidyl ether (MPGE). Add 14.08 grams of 2 methyl imidazole and 137.63 grams of triethylamine with stirring. To the reaction kettle then add 1616.48 grams of methacrylic acid (MA) at a rate of 6.6 grams per minute. After addition of methacrylic acid is completed, increase temperature of kettle to 70° C. and heat and stir until sampling shows at least 95 percent completion of reaction as determined by gas chromatography from calibration standards. Upon reaching 95 percent completion, cool reaction vessel to 40° C. and wash the resulting oily liquid with the following washes, in sequence:
(1) Distilled water;
(2) Saturated aqueous solution of sodium bicarbonate;
(3) Distilled water;
(4) One percent aqueous solution of tetrasodium ethylenediamene tetracetate; and
(5) Distilled water.

Vacuum strip residual water and recover a liquid product consisting of 3-phenoxy-2-hydroxypropyl methacrylate (designated as 3P2HPM).

PREPARATION F

To a dry air-swept, heated (45° C.) resin kettle, equipped as described in PREPARATION A, charge 262.2 grams of MOBAY TDI 2,4 toluene diisocyanate (TDI). Slowly add 48.1 grams of dried methanol (dropwise over 2.5 hours). Heat with stirring at 59° C. for two hours. Slowly add 195.2 grams of hydroxyethylmethacrylate (HEMA) stabilized with 0.25 grams of hydroquinone, at a rate so as to maintain a temperature of approximately 60° C. Upon completion of the HEMA addition, heat with stirring at 82° C. for six hours. Check for absence of NCO by IR analysis. Cool to room temperature. The resulting product comprises solid crystals of 4-methoxycarbonylamino-2-(2-methacryloxy) ethoxycarbonylaminotoluene (designated at 422 MECT).

PREPARATION G

To a dry air-swept, heated (55° C.) resin kettle, equipped as described in PREPARATION A, charge 261.1 grams of MOBAY TDI 2,4 toluenediisocyanate (TDI). Slowly add 132.2 grams of dried isopentyl alcohol (dropwise over 1.5 hours). Heat with stirring at 79° C. for two hours. Slowly add 195.2 grams of hydroxyethylmethacrylate (HEMA), dropwise over 1.5 hours. Upon completion of the HEMA addition add 0.1 grams of DABCO catalyst, and heat with stirring at 78° for five hours. Check for absence of NCO by IR analysis. Cool to room temperature. The resulting product comprises solid crystals of 4-isopentoxycarbonylamino 2-(2-methacryloxy) ethoxycarbonylamino toluene (designated as 422 IECT).

PREPARATION H

To a dry air swept, heated (60° C.) resin kettle, equipped as described in PREPARATION A, charge 1742.4 grams of allyl alcohol followed by the addition at a rate of approximately 5.97 grams per minutes of 3573.7 grams of phenyl isocyanate. The temperature of the reaction mixture is maintained at 58° to 60° C. After completion of the phenyl isocyanate addition, heat with stirring at 50° to 60° C. for two hours; check for NCO content by IR analysis. Continue heating with stirring until NCO disappears, add approximately 10 grams of allyl alcohol and stir and heat until NCO disappears (IR analysis). A solid, crystalline product 5316 grams of allyl phenylurethane (designated as AP) results.

PREPARATION I

To a resin kettle equipped as described in PREPARATION A, charge 1163.8 grams of Desmodure 1700 polyester diol. Heat with stirring at 80° C. for 3.5 hours under aspirator vacuum. Add 98.1 grams of maleic anhydride catalyzed with 0.5 grams of DABCO, in one shot, and heat with stirring at 85° C. for 2.5 hours. An oily liquid comprising the dimaleate half ester of polydiethylene glycol adipate (designated as MRM) results.

PREPARATION J

To a nitrogen-swept resin kettle, equipped as in PREPARATION A charge 150 grams of triethylene glycol, 184 grams of mercaptoacetic acid, 2.0 ml. of concentrated sulfuric acid, and 125 milliliters of toluene. Heat to reflux with stirring at temperatures from 99° C. to 126° C. for a period of two hours until water removal evidences essentially 100% completion of reaction. Upon reaching 100% completion of reaction, remove toluene by evaporation, cool and wash the resulting liquid product with the following washes, in sequence:
(1) Distilled water;
(2) Saturated solution of sodium bicarbonate;
(3) Distilled water.

Vacuum strip to remove residual water, filter, and recover a liquid product comprising triethylene glycol dimercaptoactetate (designated as MATEG).

PREPARATION K

To a nitrogen-swept resin kettle, equipped as described in PREPARATION A, add 75 grams of triethylene glycol, 106 grams of mercaptopropionic acid, 2.0 ml. of concentrated sulfuric acid and 125 ml. of toluene. Heat with stirring to reflux at temperatures of from 99° C. to 126° C. for a period of 5.5 hours and collect water. When water collected evidences essentially 100 percent completion of reaction, cool kettle to room temperature, and wash the resulting liquid product with the following washes, in sequence:
(1) Distilled water;

(2) Saturated aqueous solution of sodium bicarbonate; and
(3) Distilled water.

Vacuum strip residual water, filter and recover a liquid product comprising triethylene glycol dimercaptopropionate (designated MPTEG).

PREPARATION L

To a dry air swept resin kettle, equipped as described in PREPARATION A, charge 155 grams of Desmodure 1700 polyester glycol. Continue heating with stirring at 150° C. under aspirator vacuum. Add 43.0 grams of methacrylic acid, 2.0 ml. of concentrated sulfuric acid, and 200 ml of benzene. Heat with stirring to reflux at 90° C. for ten hours. Collect water overhead and continue heating until sampling shows approximately 97 percent completion of reaction. Upon reaching 97 percent reaction completion, cool kettle to 40° C., add 0.5 grams of hydroquinone, and remove toluene by evaporation. Wash the resulting oily liquid product with the following washes, in sequence:
(1) Distilled water;
(2) Saturated aqueous solution of sodium bicarbonate; and
(3) Water/methanol mixture.

Vacuum strip residual water/methanol and recover an oily liquid product comprising the dimethacrylate of polydiethylene glycol adipate (designated as MARAM).

PREPARATION M

To a nitrogen-swept resin kettle, equipped as described in PREPARATION A, charge 255 grams of Desmondure 1700 polyester glycol. Heat with stirring at 150° C. under aspirator vacuum. Add 31.8 grams of mercaptopropionic acid, 3.1 ml. of concentrated sulfuric acid and 300 ml. of toluene. Heat with stirring to reflux at 115° C. for 7.5 hours. Collect water overhead. Continue heating until water collection shows essentially 100 percent completion, of reaction. Upon reaching essentially 100 percent reaction completion, cool kettle to 40° C., and wash the resulting liquid product with the following washes:
(1) Distilled water;
(2) Saturated aqueous solution of sodium bicarbonate;
(3) Distilled water; and
(4) Methanol.

Vacuum strip residual methanol and recover a liquid product comprising the di-3-mercaptopropionate of polydiethylene glycol adipate (designated HSPRPSH).

PREPARATION N

To a resin kettle equipped as described in PREPARATION A charge 1232.2 g of Polymeg 2000 polyether diol available from Quaker Oats Company, Chemical Division, Chicago, Ill.—the manufacturer describes this material as a polyether with a 1,4 butylene oxide repeat unit, of approximately 2000 molecular weight. Heat kettle to 100° to 110° C. under vacuum for 60 minutes. Start dry air sweep, cool kettle to 40° C., and add in one shot 214.6 grams of MOBAY TDI 2,4 toluene diisocyanate. Upon the completion of the TDI addition, heat resin kettle with stirring (75° C. for three hours); check for NCO, add calculated amount of 2-hydroxyethylmethacrylate (HEMA)-approximately 160.4 grams and heat with stirring for four hours at 75° C. Recheck for the NCO by IR analysis. The resulting solution contains approximately 100 percent concentration of bis(2-methacryloxyethylurethane) of the poly 1,4 butylene oxide, Polymeg 2000, designated or HTPMTH corresponding to the general formula (HEMA-TDI-P2000-TDI-HEMA).

PREPARATION O

To a resin kettle equipped as described in PREPARATION A charge 1232.2 grams of Polymeg 2000 polyether diol. Heat kettle to 100° to 110° C. under vacuum for 60 minutes. Start dry air sweep, cool kettle to 40° C., and add in one shot 214.6 grams of MOBAY TDI 2,4 toluene diisocyanate. Upon the completion of the TDI addition, heat resin kettle with stirring (75° C. for three hours); check for NCO, add calculated amount of allyl alcohol, approximately 42.8 grams and heat with stirring for four hours at 75° C. Recheck for the absence of NCO by IR analysis. The resulting solution comprises essentially 100 percent concentration of the diallylurethane of the poly 1,4 butylene oxide, Polymeg 2000, designated as ATPMTA corresponding to the general formula (allyl-IDI-P2000-TDI-Allyl).

EXAMPLE 1

TABLE I shows a cure-to-elastomer composition made in accordance with the instant invention:

TABLE 1

| INGREDIENTS | FORMULATION NO. 1 Parts by Weight |
|---|---|
| HTRTH | 43.333 |
| 2MEP | 27.433 |
| 3P2HPM | 29.244 |
| Na₄EDTA | 0.100 |
| Saccharin | 1.500 |
| H₂O | 1.000 |
| APH | 1.000 |
| LUPEROX 2,5-2,5 | 1.000 |

HTRTH is prepared as in PREPARATION A.
2MEP is prepared as in PREPARATION D.
3P2HPM is prepared as in PREPARATION E.
Na₄EDTA is the tetra sodium salt of ethylene diamine tetra acetic acid.
APH is 1-acetyl 2-phenylhydrazine.
Luperox 2,5-2,5 is 2,5-dimethylhexane-2,5-dihydroperoxide available from Wallace and Tiernan, Inc., Lucidol Division, Buffalo, N.Y.

Lap shear specimens were prepared using as received ground steel plates. A small slug (approximately 0.2 grams each) of FORMULATION No. 1 were applied to separated specimens. Laps were aligned, slight finger pressure was applied to spread the applied composition, and slugs were held under slight pressure for twelve to fifteen minutes. Bond thickness was approximately 0.5 mils. Several such specimens of each FORMULATION were prepared. For some formulations, one drop (approximately 0.05 grams) of the activator Buetene, an amine-aldehyde-condensate manufactured by E. I. Dupont de Nemours Company was applied to clean surfaces, and a small slug (approximately 0.2 grams each) of FORMULATION No. 1 was applied to separated specimens before assembly.

The specimens were allowed to cure at room temperature, and were tested at room temperature for tensile shear strength. Tensile shear strength after three hours cure was approximately 1,000 psi, and after twenty form hours was approximately 2000 psi for FORMULATION No. 1.

Twenty-five gram samples of FORMULATION No. 1 prepared as described above were poured onto Teflon coated steel plates, using a cut fiber gasket with a thirty to forty mil compressed thickness. The plates were placed in a press at 5000 pounds to spread and seal the gaskets and allowed to stand under this pressure for one hour. The pressure was removed and the plates removed and clamped with 10 pound force spring clamps (10-15 clamps) around their perimeter over the gasket area. The sample plates were stored on edge for 7 days to allow full anaerobic curing of FORMULATION 1. Other formulations were cured in a similar manner or by heat curing at 100° C. for up to one hour depending on the initiator system chosen. After curing, the resulting polymer sheets were removed, placed on a piece of release paper and three or four dog bones cut from each sheet, using a 0.250 inch width, one inch extension dog bone die. Two lines, one inch apart, were made on the dog bones to measure percent elongation. The dog bones, together with a paper tape calibrated in inches were mounted in a Dillon Tensile Tester and percent elongation and tensile at 10 percent elongation increments and at break were recorded at the maximum extension speed of 6.25 inches per minute. The applied tensile force is the load divided by the starting cross-sectional area before load is applied to the dog bone sample. The results were recorded in Table 2.

TABLE 2

| Measured Length | % Elongation | Applied Tensile Force (psi) |
|---|---|---|
| 1.2 | 20% | 284 |
| 1.4 | 40% | 370 |
| 1.6 | 60% | 484 |
| 1.8 | 80% | 584 |
| 2.0 | 100% | 783 |
| 2.2 | 120% | 1040 |
| 2.4 | 140% | 1467 |
| 2.6 | 160% | 2308 |
| 2.7 | 170% | 2521* |

*Break Tensile in psi

EXAMPLES 2 TO 5

Table 3 shows four cure-to-elastomer compositions made in accordance with the instant invention. These compositions, except for formulation 5, were heat cured at 100° C. for one half hour. Composition 5 is identical to Composition 2 except for the use of our anaerobic curing system to achieve cure. These compositions were used to check the ability to vary crosslink density by compositional variations in the preparation of allyl termination, methacrylate termination and maleate termination of the polyester prepolymer. Cured samples were swelled and extracted in 2-butanone for 48 hours, the swelled volume, the unswelled extracted volume and the extracted and unextracted dry weights of the samples determined. These data were used to calculate the gel content and the swelled volume fraction. The swelled volume fraction is the swelled volume of the sample divided by the unswelled dry extracted volume. The swelled volume fraction is taken to be a good indication of the relative crosslink density of a particular crosslinked polymer. The higher the swelled volume fraction number for a particular polymer composition (in this case all of the main chain units are identical polymer units of polyester prepolymer) the lower the crosslink density.

TABLE 3

| INGREDIENTS | FORMULATION NO. | | | |
|---|---|---|---|---|
| | 2 | 3 | 4 | 5 |
| | Parts by Weight | | | |
| HTRTH | 61.12 | 14.88 | 29.75 | 61.12 |
| ATRTA | 38.88 | 85.12 | 30.21 | 38.88 |
| MRM | — | — | 40.04 | — |
| Na$_4$EDTA | 0.100 | 0.100 | 0.100 | 0.100 |
| Saccharine | — | — | — | 1.000 |
| H$_2$O | — | — | — | 1.000 |
| APH | — | — | — | 1.000 |
| Luperox 2,5-2,5 | — | — | — | 1.000 |
| Lupersol 231 | 1.000 | 1.000 | 1.000 | — |
| Swell Volume Fraction | 2.33 | 3.94 | 4.26 | 2.50 |

ATRTA is prepared as in PREPARATION B.
MRM is prepared as in PREPARATION I.
Lupersol 231 is 1,1-Bis (t-butylperoxy)3,3,5-trimethyl cyclohexane available from Wallace and Tiernan, Inc., Lucidol Division, Buffalo, N.Y.

Observations: Increasing the relative amount of allyl terminated prepolymer in a composition of ATRTA and HTRTH, FORMULATION Nos. 2 and 3, or substituting MRM for part of the ATRTA, FORMULATION Nos. 3 and 4, result in an increase in the swell volume fraction. The increased swell volume fraction, which is indicative of a decreased crosslink density, was also evidenced in the increased elongation found in going from FORMULATION No. 2 to FORMULATION No. 3 and 4 in simple pull tests. MARAM (PREPARATION L) substituted for MRM (FORMULATION No. 4) produces similar results.

EXAMPLES 6 TO 9

Table 4 shows four additional cure-to-elastomer compositions made in accordance with the present invention.

TABLE 4

| INGREDIENTS | FORMULATION NO. | | | |
|---|---|---|---|---|
| | 6 | 7 | 8 | 9 |
| | Parts by Weight | | | |
| HTRTH | 48.80 | 38.38 | 46.66 | 17.48 |
| ATRTA | 46.57 | 51.93 | 44.53 | 75.08 |
| MATEG | 4.63 | 9.69 | 8.81 | 7.44 |
| Na$_4$EDTA | 0.10 | 0.10 | 0.10 | 0.10 |
| Lupersol 231 | 1.00 | 1.00 | 1.00 | 1.00 |
| 1,4 Naphthoquinone | 0.001 | 0.001 | 0.001 | 0.001 |
| Swell Volume Fraction | 3.78 | 5.92 | 4.38 | 12.13 |
| % Elongation/Applied Tensile Force (PSI) | | | | |
| 50/40.4 | 50/18 | 50/26.4 | 100/8.2 |
| 100/60.6 | 100/30 | 100/37 | 200/10.6 |
| 150/80.8 | 200/42 | 200/52.9 | 400/14.0 |
| 200/94.2 | 300/54 | 300/72.7 | 600/16.4 |
| 250/115.8 | 400/72 | 400/92.5 | 800/20.5 |
| 270/134.6* | 500/84 | 520/132.2* | 1000/26.2 |
| | 600/120* | | 1200/36.0 |
| | | | 1400/62.2 |
| | | | 1600/85.0* |

*Break Tensile in psi based on the unextended cross section
MATEG is prepared as in Preparation J.

These formulations were cured anaerobically at room temperature and part cured at 100° C. for one hour and tested for swell volume fraction, elongation and tensile strength.

Observations: The decreasing crosslink density evidenced by increasing swell volume fraction numbers is apparently a good relative match for the elongation values recorded. All of the above FORMULATIONS were curable in the absence of peroxide by means of an ultra violet curing activator such as Irgacure 184 available from Ciba-Geiff Corporation, Ardsley, N.Y. The manufacturer describes Irgacure 184 as an ultraviolet curing activator comprising 1-Benzoyl cychohexanol. These FORMULATIONS illustrate the strong influence of the dimercaptans in reducing crosslinking and producing high elongation elastomers. The dimercaptan HSPRPSH prepared as in PREPARATION M can be substituted for MATEG at a somewhat higher level to produce similar results in FORMULATION Nos. 6 to 9. MPTEG (PREPARATION K) substituted for MATEG, produces virtually identical results.

TABLE 5

| INGREDIENTS | FORMULATION NO. | | | |
|---|---|---|---|---|
| | 10 | 11 | 12 | 13 |
| | Parts by Weight | | | |
| HTRTH | 43.96 | — | — | — |
| PEUMA | — | — | — | 44.30 |
| ATRTA | — | 66.59 | 55.97 | — |
| 422IECT | — | 33.41 | — | — |
| 2MEP | — | — | 44.03 | 26.30 |
| 3P2HPM | 56.04 | — | — | 29.40 |
| Na4EDTA | 0.10 | 0.10 | 0.10 | 0.10 |
| Saccharine | 1.00 | 1.00 | 1.00 | 1.00 |
| H2O | 1.00 | 1.00 | 1.00 | 1.00 |
| APH | 1.00 | 1.00 | 1.00 | 1.00 |
| Cumene Hydroperoxide | 1.00 | 1.00 | 1.00 | 1.00 |
| Elongation at Break | 170% | 180% | 190% | 160% |
| Tensile Strength at Break, PSI | 2500 | 1130 | 1948 | 1300 |

PEUMA is prepared as in PREPARATION C.
422IECT is prepared as in PREPARATION G.

These samples were cured anaerobically to polymer sheet samples and tested for tensile and elongation as before.

Observations: The use of monofunctional monomers increases the distance between crosslinking prepolymer segments and thus increases elongation and strength by decreasing the crosslink density. The prepolymer segment monomer, HTRTH, ATRTA and PEUMA all typically produce low elongation (50%) low strength (200 PSI) when cured by themselves. 422MECT (PREPARATION F) substituted for 422IECT (FORMULATION No. 11) produces similar results.

EXAMPLES 14 TO 17

Table 7 shows four additional cure-to-elastomer compositions made in accordance with the instant invention.

TABLE 7

| INGREDIENTS | FORMULATION NO. | | | |
|---|---|---|---|---|
| | 14 | 15 | 16 | 17 |
| | Parts by Weight | | | |
| HTRTH | — | 43.33 | 61.24 | — |
| ATRTA | 43.33 | — | — | 40.00 |
| 2MEP | 29.24 | — | — | — |
| AP | — | 29.24 | — | — |
| 3P2HPM | 27.43 | 27.42 | 38.76 | 60.00 |
| Irgacure 184 | 0.27 | 0.27 | 0.27 | 0.27 |
| Shore A Durometer | 93 | 68 | 69 | 31 |

AP is allylphenylurethane prepared as in PREPARATION H.

Observations: Variations in softness or hardness that can be obtained by varying the level and type of monofunctional monomer (allyl as compared to methacrylate) and the U.V. curing ability of these types of FORMULATIONS. All of the above FORMULATIONS were rubbery to tough flexible polymers and the FORMULATION (Nos. 14 to 17) cured to a depth of at least ¼ inch in a 30-second exposure using 0.100 Watts per in. square of U.V. radiation in a Loctite U.V. Curing Chamber Part #9458100.

EXAMPLES 18 TO 21

Table 8 shows four additional cure-to-elastomer compositions made in accordance with the instant invention.

TABLE 8

| Ingredients | Formulation No. | | | |
|---|---|---|---|---|
| | 18 | 19 | 20 | 21 |
| | Parts by Weight | | | |
| HTPMTH | 60.71 | 14.63 | 49.17 | 60.71 |
| ATPMTA | 39.24 | 85.36 | 50.83 | 39.29 |
| Na4EDTA | 0.100 | 0.100 | 0.100 | 0.100 |
| Saccharine | — | — | — | 1.000 |
| H2O | — | — | — | 1.000 |
| APH | — | — | — | 1.000 |
| Luperox 2,5-2,5 | — | — | — | 1.000 |
| Lupersol 231 | 1.000 | 1.000 | 1.000 | — |

HTPMTH is prepared as in PREPARATION N.
ATPMTA is prepared as in PREPARATION O.

The formulations were heat cured at 100° C. as before. Cured samples were then swelled and extracted as before, and the swelled volume fraction determined as before, and was found to be in the range of about 2.25 to 4.00.

As will be appreciated, the foregoing invention provides novel and improved cure-to-elasomer composition systems. The composition systems have the ability to cure through large gaps. The compositions cure at room temperature in situ. The cured compositions have excellent adherence to plastics, metal, glass and wood making them useful also as resilient adhesives in gaskets. Moreover, the cured compositions are hydrolytically stable and are insoluble in and highly swell resistant to liquid hydrocarbons making them particularly useful for forming gaskets which may come in contact with gasoline, lubricating oils and the like.

The invention is susceptible to modification. For example, as noted supra ultraviolet (uv) initiators could be included in the compositions when particularly fast fixture time is required. Moreover, many of the compositions may be anaerobically cured at room temperature, i.e. without application of external heat. Still other changes will be obvious to one skilled in the art.

I claim:

1. A cure-to-elastomer composition comprising, in combination:
   (a) a moderate-to-long chain di or polyfunctional prepolymer having vinyl reactive ends;
   (b) a cross-link controlling material which is (i) reactive with said moderate-to-long chain di or polyfunctional prepolymer, and (ii) soluble in or miscible with said moderate-to-long chain prepolymer; and
   (c) a free radical polymerization initiator.

2. The composition of claim 1, wherein said cross-link controlling material comprises a monofunctional short chain monomer, a polymerization chain transfer coupling agent, or a mixture thereof.

3. The composition of claim 1, wherein said moderate-to-long chain polyfunctional prepolymer comprises a polyether-urethane-acrylate, a polyether-urethanemethacrylate, a polyester-urethane-acrylate, a polyester-urethane methacrylate, or an allyl alcohol derivative thereof.

4. The composition of claim 3, wherein the polyester portion of said polyester-urethane-acrylate or -methacrylate comprises a polyester diol.

5. The composition of claim 4, wherein said polyester diol comprises the reaction product of diethylene glycol and adipic acid.

6. The composition of claim 4, wherein said polyester diol comprises the reaction product of neopentyl glycol and 1,6-hexane diol with adipic acid.

7. The composition of claim 3, wherein the polyether portion of said polyether-urethane-acrylate or -methacrylate comprises a polyether diol.

8. The composition of claim 7, wherein said polyether diol comprises a polyether with a 1,4 butylene oxide repeat unit.

9. The composition of claim 1, wherein said moderate-to-long chain polyfunctional prepolymer comprises a difunctional monomer selected from the group consisting of a dimaleate half ester of polydiethylene glycol adipate and a dimethacrylate of polydiethylene glycol adipate.

10. The composition according to claim 1, wherein said moderate-to-long chain polyfunctional prepolymer comprises a diallyl urethane of polydiethylene glycol adipate polyester.

11. A composition according to claim 1, wherein said free radical catalyst system comprises a free-radical initiator and an accelerator of free-radical polymerization.

12. A composition of claim 11, wherein said free-radical initiator is selected from the group consisting of organic peroxides, hydroperoxides, peresters and peracids.

13. The composition of claim 12, wherein said perester free radical initiator comprises t-butyl perbenzoate.

14. The composition of claim 12, wherein said free radical initiator comprises cumene hydroperoxide.

15. The composition of claim 1, wherein said free-radical initiator is of the photoinitiator-type.

16. The composition of claim 1, wherein said polymerization initiator comprises 0.1 to 10 percent by weight of the combination of said polymerizable monomers and said initiator.

17. A composition of claim 1, wherein said cross-link controlling material comprises a co-reactive monomer selected from the group consisting of monomethacrylate and monoacrylate esters of aryl, alkyl and arylalkyl alcohols.

18. The composition of claim 1, wherein said cross-link controlling material comprises a co-reactive monomer selected from the group consisting of arylamino, alkylamino and arylalkyl amino methacrylate and acrylate esters.

19. The composition of claim 1, wherein said cross-link controlling material comprises a co-reactive monomer selected from the group consisting of the reaction products of phenyl glycidyl ether and methacrylic acid or acrylic acid, 3-phenoxy-2-hydroxypropyl methacrylate and 3-phenoxy-2-hydroxypropyl acrylate.

20. The composition of claim 1, wherein said cross-link controlling material comprises a co-reactive monomer selected from the group consisting of the reaction products of methacrylic acid or acrylic acid with para-tertiary butyl phenyl glycidyl ether, ortho-cresyl glycidyl ether, butyl glycidyl ether and the glycidyl ethers of decane to octadecane.

21. The composition of claim 1, wherein said cross-link controlling material comprises a co-reactive monomer selected from the group consisting of glycidyl acrylate and methacrylate esters, mixed esters of glycerol 1-(2-ethyl) hexanoate-3-methacrylate and glycerol 1-(2-ethyl) hexanoate-3-acrylate prepared by reacting glycidyl methacrylate or glycidyl acrylate and 2-ethyl hexanoic acid.

22. The composition of claim 1, wherein said cross-link controlling material comprises a co-reactive monomer selected from a group consisting of the reaction products of 1-hydroxyethylmethacrylate, 2-hydroxyethylacrylate, 2-hydroxypropylmethacrylate and 2-hydroxypropylacrylate and an isocyanate.

23. The composition of claim 1, wherein said cross-link controlling material comprises a co-reactive monomer selected from the group consisting of the reaction products of 2-hydroxyethylmethacrylate and methanol with toluene diisocyanate, 2-hydroxypropyl methacrylate and methanol with toluene diisocyanate; 2-hdyroxyethylmethacrylate and isopentyl alcohol with 2,4 toluenediisocyanate; and 2-hydroxyethyl methacrylate with phenylisocyanate.

24. The composition of claim 2, wherein said cross-link controlling material comprises a polymerization chain transfer and coupling agent selected from the group consisting of the dimercaptoacetates and substituted dimercaptocarboxycylic acid esters of glycol polyethers and polyesters.

25. The composition of claim 24, wherein said polymerization chain transfer and coupling agent comprises triethylene glycol dimercaptoacetate.

26. The composition of claim 22, wherein said polymerization chain transfer and coupling agent comprises triethylene glycol dimercaptopropionate.

27. The composition of claim 24, wherein said polymerization chain transfer and coupling agent comprises the dimercaptoproprionate of polydiethylene glycol adipate.

28. The composition of claim 2, wherein said monofunctional short-chain monomer comprises 4-methoxycarbonylamino-2-(2-methacryloxy) ethoxycarbonylaminotoluene.

29. The composition of claim 2, wherein said monofunctional short-chain monomer comprises 4-isopentoxycarbonylamino-2-(2-methacryloxy) ethoxycarbonylaminotoluene.

30. The composition of claim 2, wherein said monofunctional short-chain monomer comprises 3(p-tertiary butyl) phenoxy-2-hydroxy propyl methacrylate or acrylate.

31. The composition of claim 2, wherein said polyfunctional prepolymer comprises the dimaleate half ester of polydiethylene glycol adipate.

32. The composition of claim 1, wherein said polyfunctional prepolymer comprises the diallylurethane of polydiethylene glycol adipate.

33. The composition of claim 2, wherein said polyfunctional prepolymer comprises the dimethacrylate of polydiethylene glycol adipate.

34. The composition of claim 2, wherein said monofunctional monomer comprises 2-methacryloxyethyl phenyl urethane.

35. The composition according to claim 1, an optionally including a chelating agent.

36. The composition of claim 1, and comprising from about 50 to about 98 mole percent of cross-link controlling material.

37. The composition of claim 36, and comprising from about 91 to about 95 mole percent of cross-link controlling material.

38. A method of forming an elastomeric material, comprising the steps of
   (1) providing a cure-to-elastomer composition which comprises at least one moderate-to-long chain di or polyfunctional prepolymer having vinyl reactive ends; and at least one cross-link controlling material which is (i) reactive with said moderate-to-long chain di or polyfunctional prepolymer, and (ii) soluble in or miscible with said moderate-to-long chain prepolymer; and
   (2) curing the composition of step (1) in the presence of a free radical polymerization initiator.

39. The method of claim 38, wherein said cross-link controlling material comprises a monofunctional short chain monomer, a polymerization chain transfer coupling agent, or a mixture thereof.

40. The method of claim 38, wherein said moderate-to-long chain polyfunctional prepolymer comprises a polyether-urethane-acrylate, a polyether-urethane methacrylate, a polyester-urethane acrylate, a polyester-urethane-methacrylate, or an allyl alcohol derivative thereof.

41. The method of claim 40, wherein the polyester portion of said polyester-urethane methacrylate comprises a polyester diol.

42. The method of claim 41, wherein said polyester diol comprises the reaction product of diethylene glycol and adipic acid.

43. The method of claim 41, wherein said polyester diol comprises the reaction product of neopentyl glycol and 1,6-hexane diol with adipic acid.

44. The composition of claim 40, wherein the polyether portion of said polyether-urethane-acrylate or -methacrylate comprises a polyether diol.

45. The composition of claim 44, wherein said polyether diol comprises a polyether with a 1,4 butylene oxide repeat unit.

46. The method of claim 38, wherein said moderate-to-long chain polyfunctional prepolymer comprises a difunctional monomer selected from the group consisting of a dimaleate half ester of polydiethylene glycol adipate and a dimethacrylate of polydiethylene glycol adipate.

47. The method of claim 36, wherein said moderate-to-long chain polyfunctional prepolymer comprises a diallyl urethane of polydiethylene glycol adipate polyester.

48. A method of claim 36, wherein said free radical catalyst system comprises a free-radical initiator and an accelerator of free-radical polymerization.

49. A method of claim 48, wherein said free-radical initiator is selected from the group consisting of organic peroxides, hydroperoxides, peresters and peracids.

50. The method of claim 49, wherein said perester free radical initiator comprises t-butyl perbenzoate.

51. The method of claim 49, wherein said free radical initiator comprises cumene hydroperoxide.

52. The method of claim 38, wherein said free-radical initiator is of the photoinitiator-type, and including the step of exposing said compositions to light of wave length and intensity to effect cure of said composition.

53. The method of claim 38, wherein said polymerization initiator comprises 0.1 to 10 percent by weight of the combination of said polymerizable monomers and said initiator.

54. A method of claim 38, wherein said cross-link controlling material comprises a co-reactive monomer selected from the group consisting of monomethacrylate and monoacrylate esters of aryl, alkyl and arylalkyl alcohols.

55. The method of claim 38, wherein said cross-link controlling material comprises a co-reactive monomer selected from the group consisting of arylamino, alkylamino and arylalkyl amino methacrylate and acrylate esters.

56. The method of claim 38, wherein said cross-link controlling material comprises a co-reactive monomer selected from the group consisting of the reaction products of phenyl glycidyl ether and methacrylic acid or acrylic acid, 3-phenoxy-2-hydroxypropyl methacrylate and 3-phenoxy-2-hydroxypropyl acrylate.

57. The method of claim 38, wherein said cross-link controlling material comprises a co-reactive monomer selected from the group consisting of the reaction products of methacrylic acid or acrylic acid with para-tertiary butyl phenyl glycidyl ether, ortho-cresyl glycidyl ether, butyl glycidyl ether and the glycidyl ethers of decane to octadecane.

58. The method of claim 38, wherein said cross-link controlling material comprises a co-reactive monomer selected from the group consisting of glycidyl acrylate and methacrylate esters, mixed esters of glycerol 1-(2-ethyl) hexanoate-3-methacrylate and glycerol 1-(2-ethyl) hexanoate-3-acrylate prepared by reacting glycidyl methacrylate or glycidyl acrylate and 2-ethyl hexanoic acid.

59. The method of claim 38, wherein said cross-link controlling material comprises a co-reactive monomer selected from a group consisting of the reaction products of 1-hydroxyethylmethacrylate, 2-hydroxyethylacrylate, 2-hydroxypropylmethacrylate and 2-hydroxypropylacrylate and an isocyanate.

60. The method of claim 38, wherein said cross-link controlling material comprises a co-reactive monomer selected from the group consisting of the reaction products of 2-hydroxyethylmethacrylate and methanol with toluene diisocyanate, 2-hydroxypropyl methacrylate and methanol with toluene diisocyanate; 2-hydroxyethylmethacrylate and isopentyl alcohol with 2,4 toluenediisocyanate; and 2-hydroxyethyl methacrylate with phenylisocyanate.

61. The method of claim 38, wherein said cross-link controlling material comprises a polymerization chain transfer and coupling agent selected from the group consisting of the dimercaptoacetates and substituted dimercaptocarboxycylic acid esters of glycol polyethers and polyesters.

62. The method of claim 61, wherein said polymerization chain transfer and coupling agent comprises triethylene glycol dimercaptoacetate.

63. The method of claim 61, wherein said polymerization chain transfer and coupling agent comprises triethylene glycol dimercaptopropionate.

64. The method of claim 61, wherein said polymerization chain transfer and coupling agent comprises the dimercaptoprorionate of polydiethylene glycol adipate.

65. The method of claim 39, wherein said mono-functional short-chain monomer comprises 4-methoxycarbonylamino-2-(2-methacryloxy) ethoxycarbonylaminotoluene.

66. The method of claim 39, wherein said mono-functional short-chain monomer comprises 4-isopentoxycarbonylamino-2-(2-methacryloxy) ethoxycarbonylaminotoluene.

67. The method of claim 39, wherein said mono-functional short-chain monomer comprises 3(p-tertiary butyl) phenoxy-2-hydroxy propyl methacrylateacrylate.

68. The method of claim 38, wherein said polyfunctional prepolymer comprises the dimaleate half ester of polydiethylene glycol adipate.

69. The method of claim 38, wherein said polyfunctional prepolymer comprises the diallylurethane of polydiethylene glycol adipate.

70. The method of claim 38, wherein said polyfunctional prepolymer comprises the dimethacrylate of polydiethylene glycol adipate.

71. The method of claim 39, wherein said monofunctional monomer comprises 2-methacryloxyethyl phenyl urethane.

72. The method of claim 38 and including a chelating agent in said composition.

73. The method of claim 38, wherein said composition comprises from about 50 to about 98 mole percent of cross-link controlling material for each mole of prepolymer.

74. The method of claim 73, wherein said composition comprises from about 91 to about 95 mole percent of cross-link controlling material for each mole of prepolymer.

* * * * *